(12) United States Patent
Bihari

(10) Patent No.: US 10,910,930 B2
(45) Date of Patent: Feb. 2, 2021

(54) MACHINE FOR SHAPING RECTANGULAR WIRE COIL HEADS

(71) Applicant: DANA TM4 INC., Boucherville (CA)

(72) Inventor: Gyula Bihari, Brossard (CA)

(73) Assignee: DANA TM4 INC., Boucherville (CA)

( * ) Notice: Subject to any disclaimer, the term of this patent is extended or adjusted under 35 U.S.C. 154(b) by 184 days.

(21) Appl. No.: 15/770,516

(22) PCT Filed: Oct. 26, 2015

(86) PCT No.: PCT/CA2015/051087
§ 371 (c)(1),
(2) Date: Apr. 24, 2018

(87) PCT Pub. No.: WO2017/070770
PCT Pub. Date: May 4, 2017

(65) Prior Publication Data
US 2018/0226865 A1  Aug. 9, 2018

(51) Int. Cl.
*B23P 19/00* (2006.01)
*H02K 15/04* (2006.01)

(52) U.S. Cl.
CPC ...... *H02K 15/045* (2013.01); *Y10T 29/53143* (2015.01)

(58) Field of Classification Search
CPC ........... H02K 15/0414; H02K 15/0428; H02K 15/045; H02K 15/0037; H02K 15/0435; H02K 15/066; Y10T 29/49009; Y10T 29/53143; Y10T 29/5187
USPC ... 29/732, 33 F, 34 D, 735, 736, 564.1, 596, 29/605, 606
See application file for complete search history.

(56) References Cited

U.S. PATENT DOCUMENTS

| | | | |
|---|---|---|---|
| 5,619,787 A | 4/1997 | Couture et al. | |
| 8,209,851 B2 | 7/2012 | Caya et al. | |
| 9,871,430 B2 * | 1/2018 | Ohno | H02K 15/064 |
| 9,917,494 B2 * | 3/2018 | Yamada | H02K 15/04 |
| 2007/0000122 A1 | 1/2007 | Caya et al. | |

(Continued)

OTHER PUBLICATIONS

PCT International Search Report of International Searching Authority for International Patent Application No. PCT/CA2015/051087, dated Apr. 1, 2016, 3 pages.

(Continued)

*Primary Examiner* — Thiem D Phan
(74) *Attorney, Agent, or Firm* — McCoy Russell LLP

(57) ABSTRACT

A machine that forms the heads of coils made of rectangular wire so that it fits within the slots of the stator of an electric machine. The machine receives a coil having unformed first and second heads separated by first and second legs and applies controlled deformation to yield properly shaped heads. The machine comprises first and second leg support mechanisms for gripping the first and second legs and head-forming elements mounted to the first and second leg support mechanisms for contacting portions of the heads of the coil while the first and second legs are gripped by the leg support. Actuators are provided for causing sequential actuated movements of one of the first and second legs to force the head-forming elements into contact with different portions of the first and second heads while allowing selective free movements of the other leg in response to the actuated movements.

28 Claims, 17 Drawing Sheets

(56) References Cited

U.S. PATENT DOCUMENTS

2008/0093948 A1    4/2008   Naganawa
2015/0229189 A1    8/2015   Tsuiki et al.

OTHER PUBLICATIONS

PCT Written Opinion of International Searching Authority for International Patent Application No. PCT/CA2015/051087, dated Apr. 1, 2016, 6 pages.

* cited by examiner

FIG_4

MACHINE FOR SHAPING RECTANGULAR WIRE COIL HEADS

CROSS REFERENCE TO RELATED APPLICATIONS

This application is a national phase under 35 U.S.C. § 371 of International Application No. PCT/CA2015/051087 filed on Oct. 26, 2015, the entirety of which is incorporated by reference herein.

FIELD

The present disclosure relates to coils mounted to the stator of electric machines. More specifically, the present disclosure is concerned with a machine to shape the head of such coils when they are made of semi-rigid rectangular wires.

BACKGROUND

Coils for electric machine made of a relatively large rectangular wire are known in the art. For example, U.S. Pat. No. 5,619,787 titled "Method for Mounting Conductor Sections onto a Stator Frame of a Dynamoelectric Machine" and naming Pierre Couture et al. as inventors describes such a coil and a method of fabrication of the coil. FIG. 16 of this patent is particularly interesting since it illustrates a two-part mould used to form the head of the coil.

A drawback of the use of such a two-part mould to shape the head of the coil is the inherent contact between the mould portions and the rectangular wire forming the coil. Indeed, this contact may cause abrasion or other defects of the rectangular wire insulation. Furthermore, different two-part moulds must be machined for different coil head shapes. Also, since the rotor head and the terminal head do not have the same number of turns, the molds for the two coil heads are not identical.

U.S. Pat. No. 8,209,851 titled "Machine for Shaping Rectangular Wire Coil Heads and Method Therefor" and naming Caya et al. as inventors describes a wire coil head-forming machine that aims at solving the above-described drawback. However, as a new drawback, Caya's machine forms multiple-turn wire coils that have a fuzzy demarcation between each head and the legs (see FIG. 1).

An object is therefore to provide a rectangular wire coil head shaping machine that yields precisely formed heads.

SUMMARY

The problem of uncontrolled deformation on a head of semi-rigid wire coil during forming thereof is solved by allowing free movement of one leg of the coil in response to a relative movement of the legs of the coil during the forming of the heads thereof.

More specifically, in accordance with an illustrative embodiment, there is provided a machine for forming first and second heads of a semi-rigid wire coil separated by first and second legs, the machine comprising a frame; a first leg gripper mounted to the frame and including a first leg-receiving mechanism for receiving the first leg and a first leg-restraining mechanism that is movable relative to the first leg support between a first resting position and a first gripping position that immobilizes the first leg in the first leg support. The machine also comprises a second leg gripper including a second leg-receiving mechanism for receiving the second leg and a second leg-restraining mechanism that is movable relative to the second leg support between a second resting position and a second gripping position that immobilizes the second leg in the second leg support; the first and second leg grippers being mounted to the frame for at least one actuated movement of one of the first and second legs; and at least one head-forming element mounted to one of the first and second leg grippers for contacting at least a portion of one of the first and second heads of the wire coil during the at least one actuated movement. The second leg gripper being further mounted to the frame so as to allow free movement thereof towards the first leg gripper during the movement of the second leg-restraining mechanism between the second resting position and the second gripping position.

According to another aspect, there is provided a method for forming first and second heads of a wire coil separated by first and second legs, the method comprising: gripping the first leg; and gripping the second leg so as force at least one of the first and second heads into contact with at least one head-forming element while simultaneously allowing free movement of the second leg towards the first gripped leg.

Other objects, advantages and features will become more apparent upon reading the following non-restrictive description of illustrated embodiments thereof, given by way of example only with reference to the accompanying drawings.

DETAILED DESCRIPTION

Generally stated, the present disclosure is concerned with a head-forming machine to form the heads of coils made of relatively large rectangular wires. The resulting coils are configured to fit within the slots of the stator of an electric machine (not shown). The head-forming machine receives a coil having unformed heads and apply controlled deformations thereto to yield properly shaped heads. The coil of wire is semi-rigid so as to be self-supporting.

Figure 2:
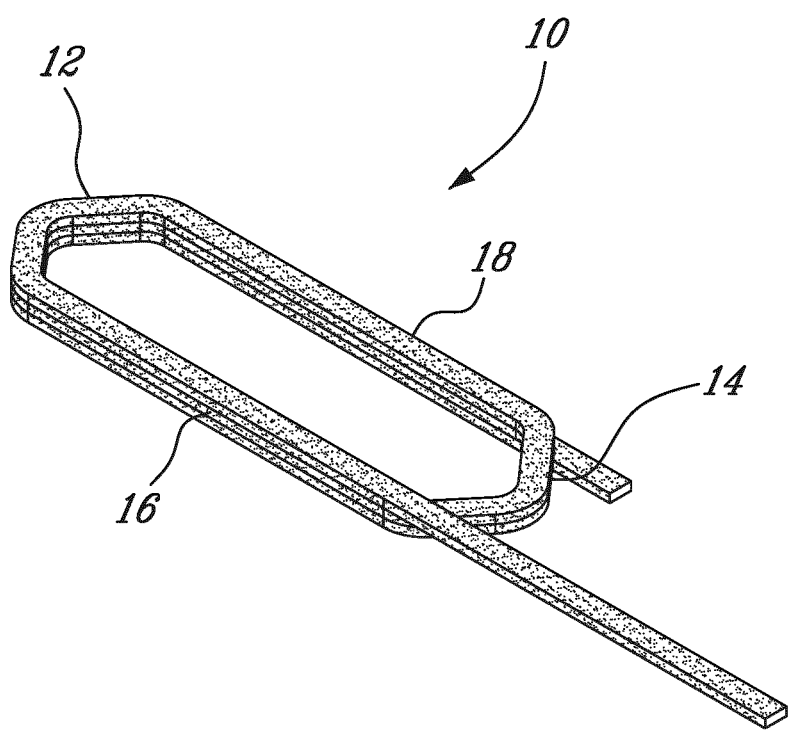
FIG. 2 is a perspective view of a multiple turn coil made of a semi-rigid rectangular wire before any head-forming operation is done to it.

FIG. 2 of the appended drawings illustrates a multiple-turn coil 10 having a first head 12, often referred to as a rotor side head, and a second head 14, often referred to as the terminal side head, both heads 12 and 14 being separated by straight legs 16 and 18 that are often referred to as coil sides. It is to be noted that the heads 12 and 14 of the coil 10 are generally coplanar, thus unformed.

Turning now to FIGS. 3 to 6 of the appended drawings, a head-forming machine 20 will be described. As will become more apparent upon reading the following description, the head-forming machine 20 allows receiving and transforming a wire coil having one or many turns of wire.

The head-forming machine 20 comprises first and second leg grippers 23 and 25, respectively mounted to a frame 22 via first and second mounting assemblies 24 and 26. The first and second leg grippers 23 and 25 include respective first and second leg-receiving mechanisms 38 and 74 and respective first and leg-restraining mechanisms 40 and 76.

Figure 5:
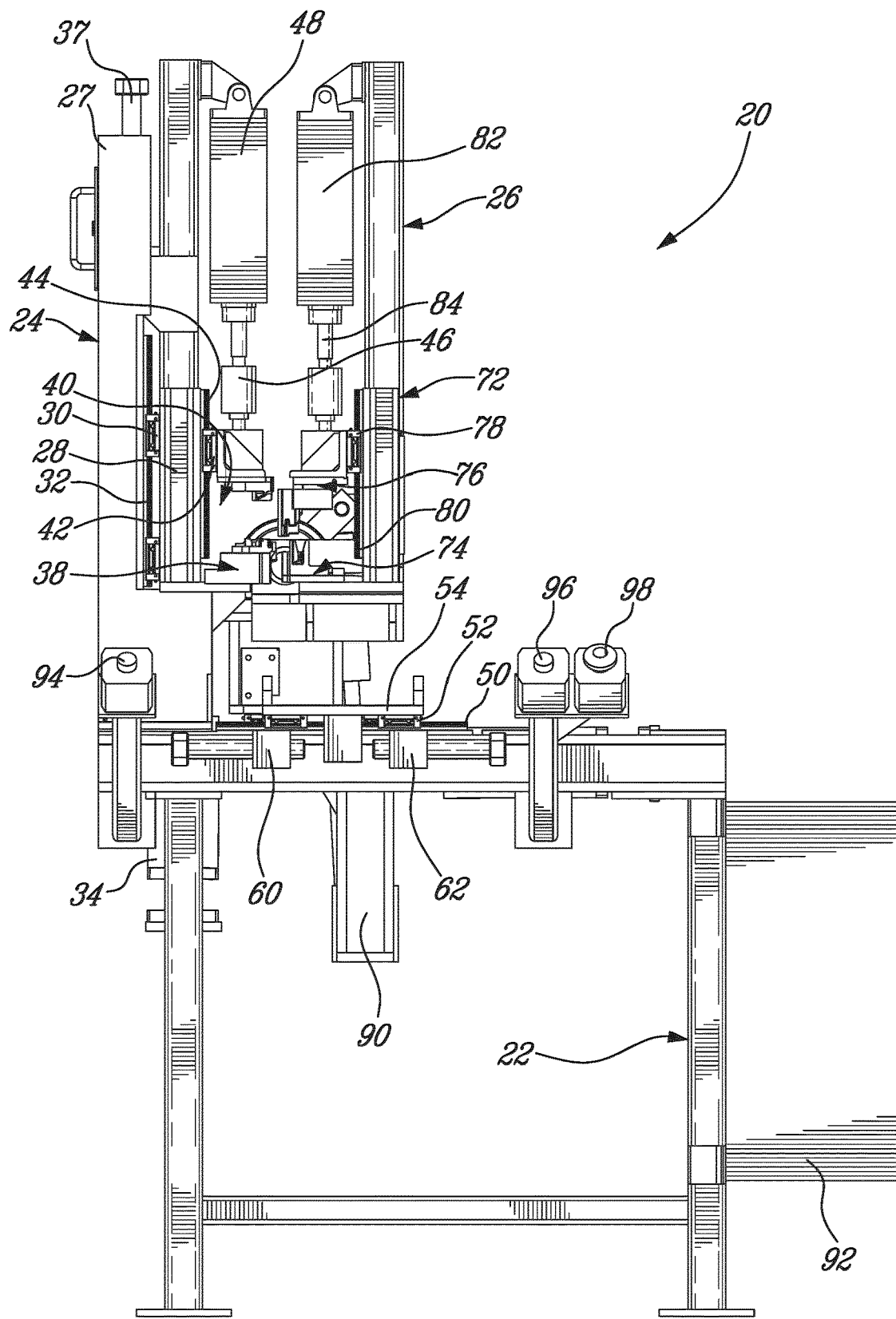
FIG. 5 is a front elevation view of the head-forming machine of FIG. 3.
Figure 6:
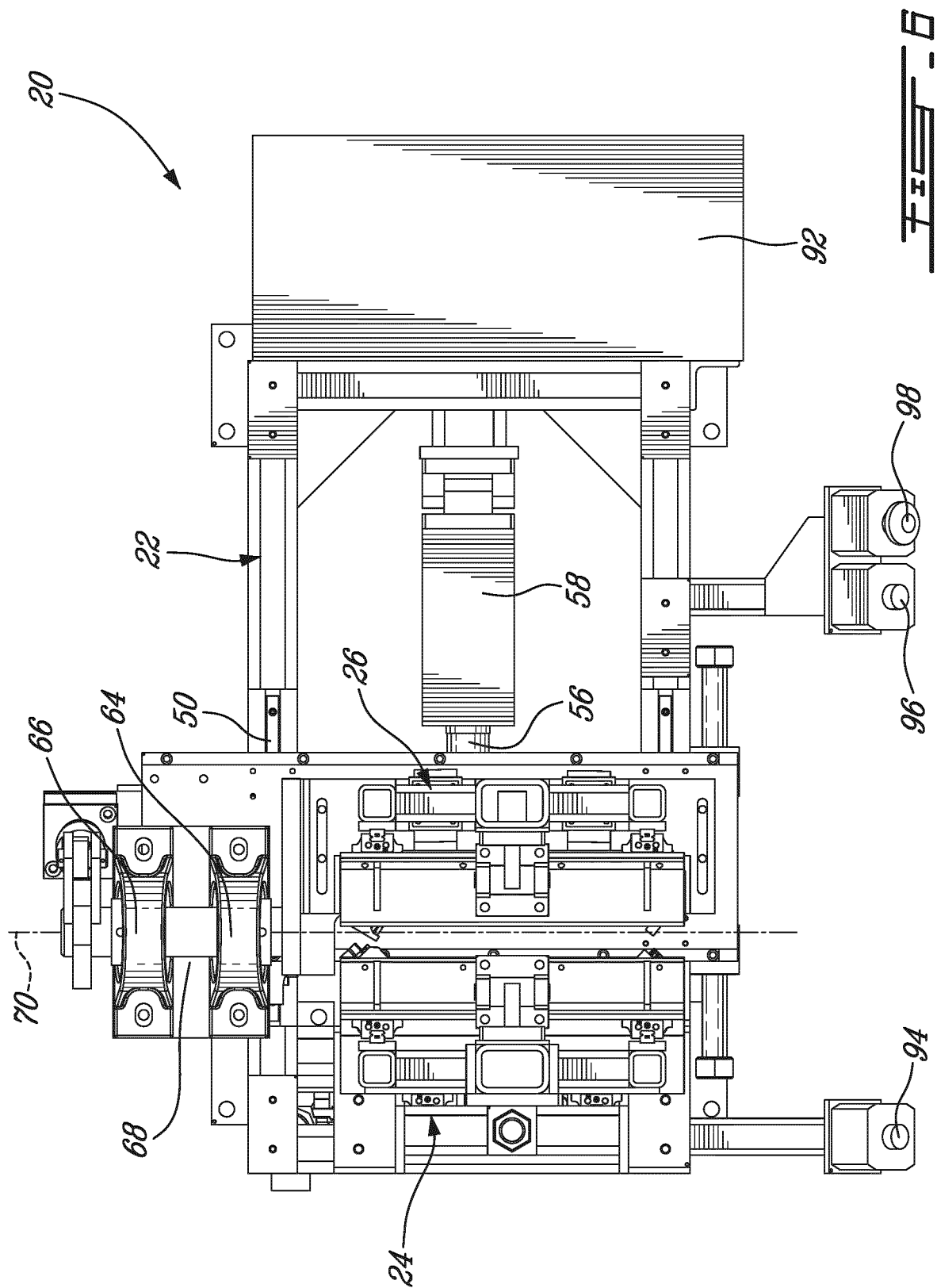
FIG. 6 is a top plan view of the head-forming machine of FIG. 3.

The first mounting assembly 24 includes a fixed portion 27 fixedly secured to the frame 22 and a movable portion 28 slidably mounted to the fixed portion 27 via corresponding sliding elements 30 and 32 (see FIG. 5).

Figure 3:
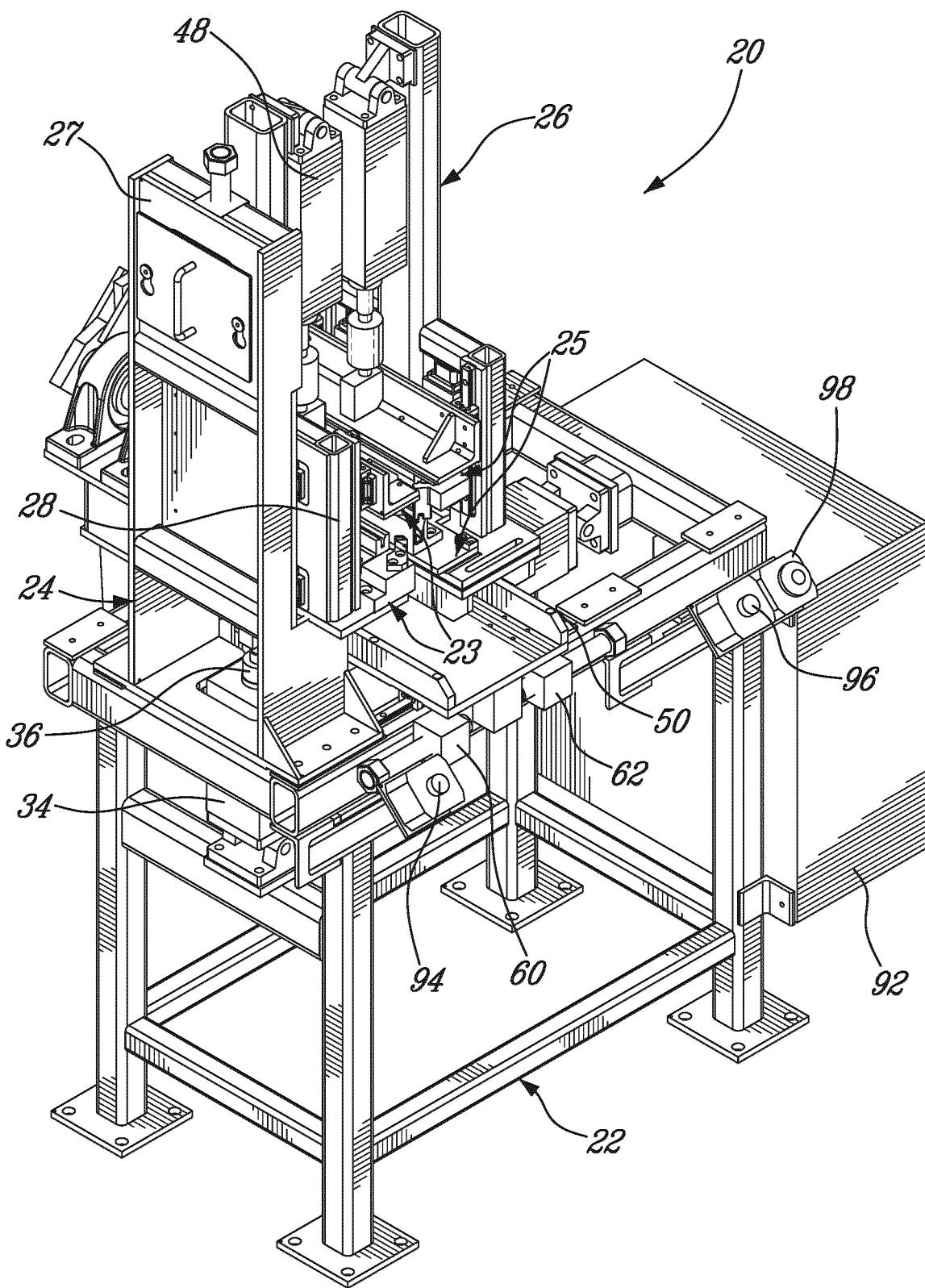
FIG. 3 is a front perspective view of a head-forming machine according to an illustrative embodiment.

As can be better seen from FIG. 3, the movements between the fixed portion 27 and the movable portion 28 are actuated by a cylinder 34 mounted to the frame 22 and provided with a piston 36 connected to the movable portion 28. It is to be noted that an adjustable stop 37 (see FIG. 5) limits the range of translation of the movable portion 28 with respect to the fixed portion 27.

As will now become more apparent, separating the leg support in the two leg grippers 23 and 25, and slidably mounting the movable portion 28 to the fixed portion 27, allow the relative movements of the two leg grippers 23 and 25 along a first direction. Moreover, as will be described hereinbelow in more detail, positioning head-forming elements along the path of the wire coil heads 12-14 during movement thereof will allow applying controlled deformation thereto.

Figure 4:
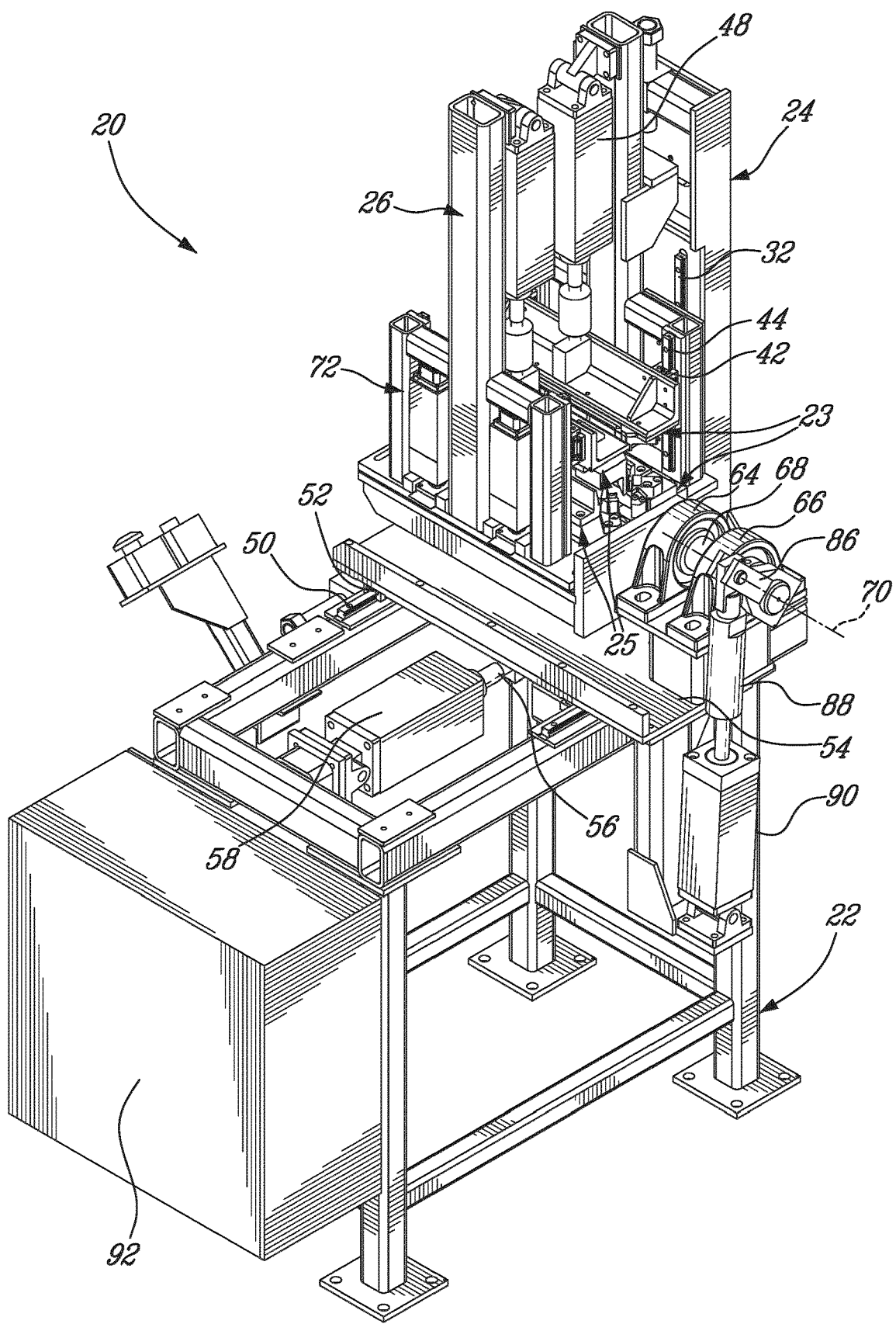
FIG. 4 is a rear perspective view of the head-forming machine of FIG. 3.

With references to FIGS. 4 and 5, the first leg-receiving mechanism 38 is fixedly mounted to the movable portion 28 of the first assembly 24 and the movable first leg-restraining mechanism 40 is slidably mounted to the movable portion 28 via corresponding sliding elements 42 and 44. A piston 46 of a cylinder 48 interconnects the first leg-restraining mechanism 40 to the movable portion 28 to selectively actuate the movements of the first leg-restraining mechanism 40. The first leg-restraining mechanism 40 is mounted to the movable portion for reciprocating movement between a resting position and a restraining position, by which it prevents the first leg 16 from moving in the first leg-receiving mechanism 38. The leg-receiving mechanism 38 and the leg-restraining mechanism 40 will be discussed in greater details hereinbelow.

With reference now to FIG. 4 of the appended drawings, the second mounting assembly 26 includes a supporting table 54, which is slidably mounted to the frame 22 via corresponding sliding elements 50 and 52. A cylinder 58, provided with a piston 56, also interconnects the frame 22 and the table 54 to selectively actuate the sliding movements of the table 54 with respect to the frame 22. As is better seen from FIG. 5 of the appended drawings, two adjustable stops 60 and 62 limit the course of the table 54. As will be described hereinbelow in more detail, the sliding movement of the table 54 allows the relative movement of the two symmetrical leg grippers 23 and 25 along a second direction.

A pivoting sub-assembly 72, which includes the second leg gripper 25, pivotally mounts the table 54 to the frame 22, thereby extending the range of movements between the first and second leg grippers 23 and 25. More specifically, the pivoting sub-assembly 72 is mounted to the table 54 via a shaft 68 secured to the table 54 via two pillow blocks 64 and 66. The shaft 68 defines a pivot axis 70.

The second leg support 74 is fixedly mounted to the pivoting sub-assembly 72 and the movable second leg-restraining mechanism 76 is slidably mounted thereto via corresponding sliding elements 78 and 80. A cylinder 82 provided with a piston 84 actuates the movements of the second leg-restraining mechanism 76 with respect to the second leg support 74.

As can be better seen from FIG. 4, an arm 86 is mounted to the end of the shaft 68 and is connected to the piston 88 of a cylinder 90 to thereby interconnect the arm 86 to the table 54. Accordingly, the cylinder 90 actuates the pivoting movement of the shaft 68 about the axis 70.

A controller 92 is operatively connected to the various actuators of the machine 20 to control their operation. Furthermore, for safety reasons, two distanced start buttons 94 and 96 are provided to start the machine 20. An emergency stop button 98 is also provided.

One skilled in the art will understand that the cylinders and pistons described hereinabove may be pneumatic or hydraulic. Also, other types of actuators can be used to actuate the mobile parts of the machine 20, including without limitations motors, belts and pulleys, etc.

Figure 7:
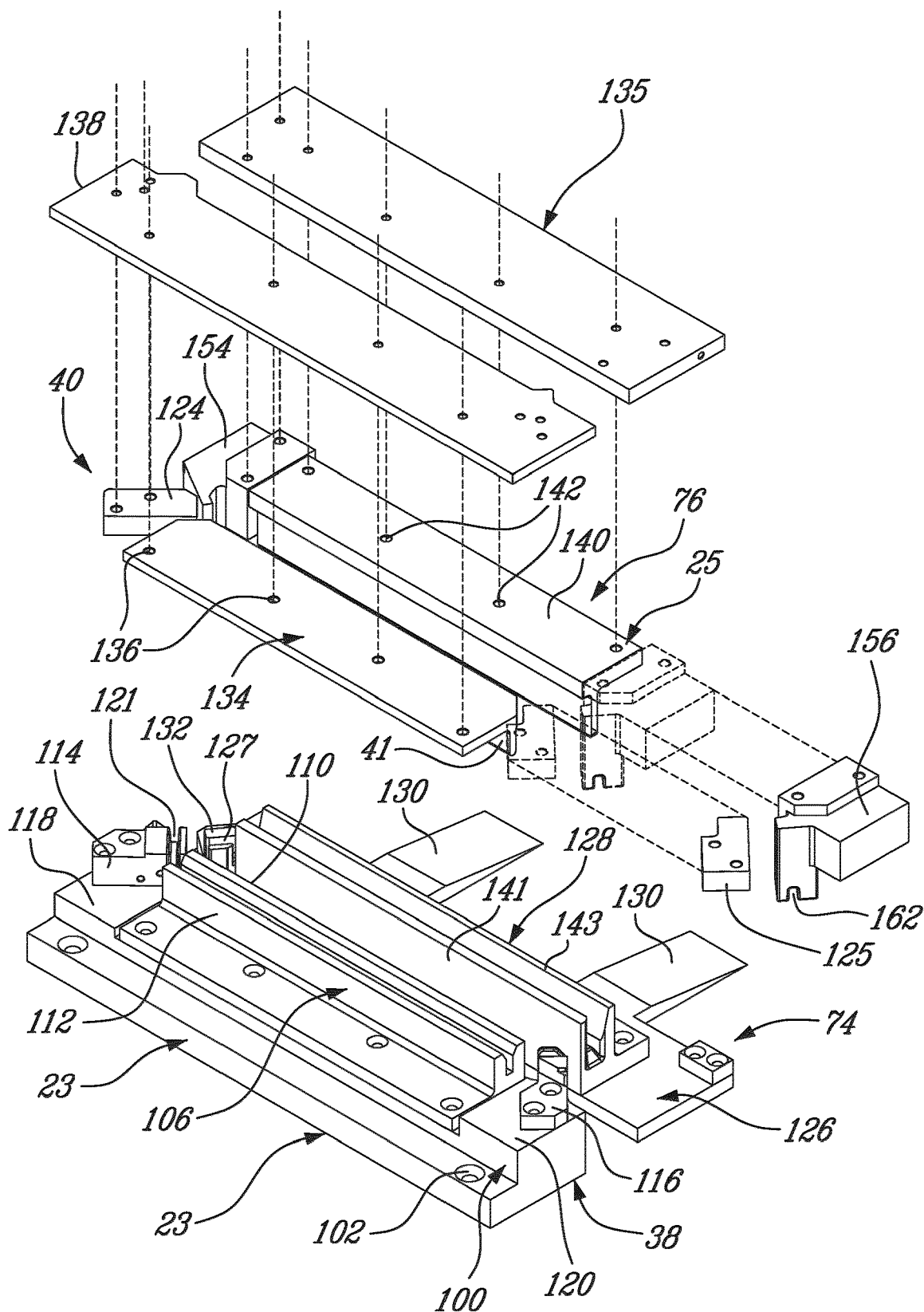
FIG. 7 is a top perspective partly exploded view of the leg grippers of the head-forming machine of FIG. 3.
Figure 8:
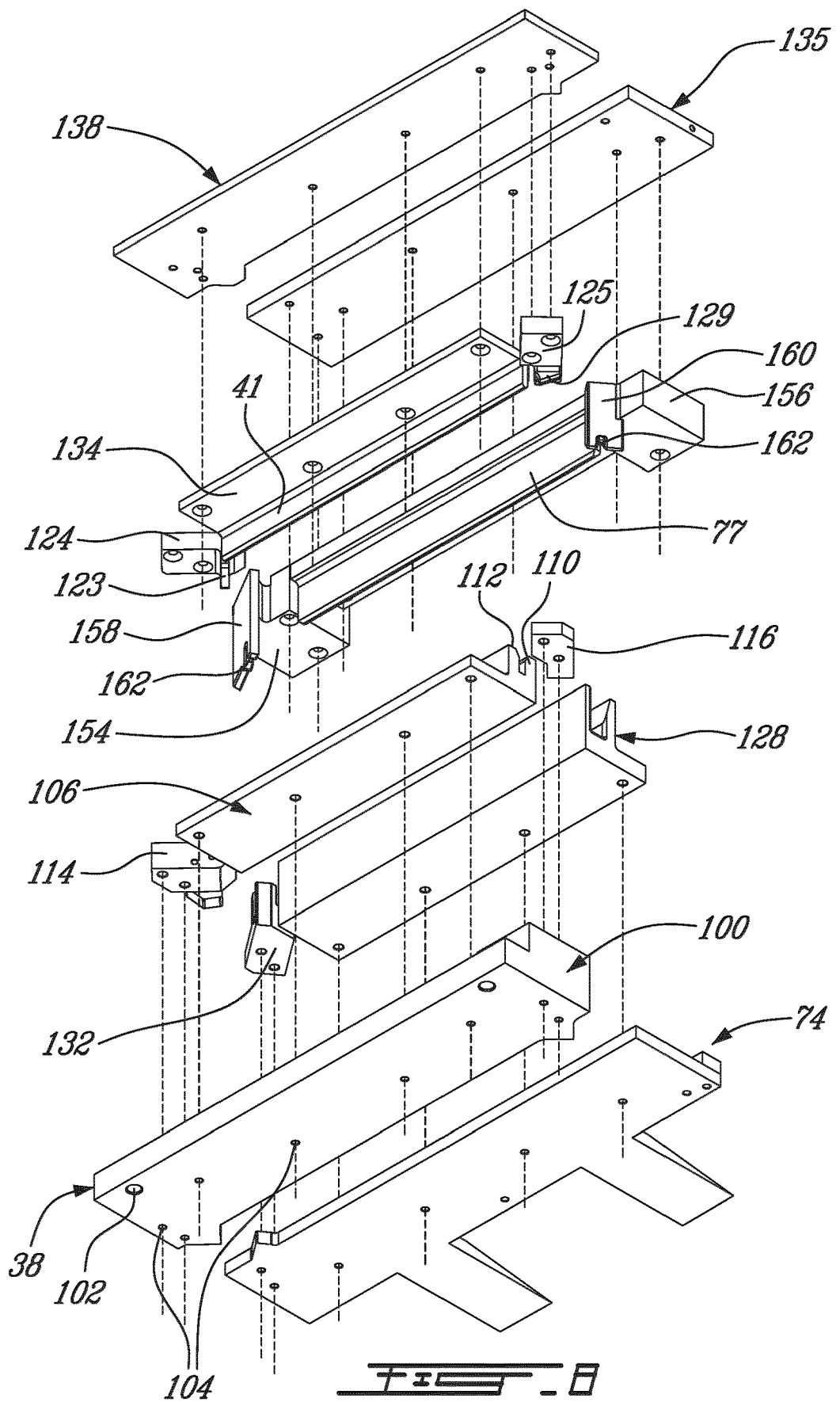
FIG. 8 is a bottom exploded perspective view of the leg grippers of FIG. 7.

FIGS. 7 and 8 illustrate in greater details the coil contacting portions of the first and second leg-receiving mechanisms 38 and 74 and of the first and second leg-restraining mechanisms 40 and 76.

The first leg-receiving mechanism 38 includes a support plate 100 provided with apertures 102, designed to secure the support plate 100 to the first assembly 24, and smaller apertures 104 allowing elements to be mounted to the support plate 100.

A flaring U-shaped bracket 106, configured and sized to receive the first leg 16 of the coil 10, is mounted to the support plate 100 via fasteners (not shown) secured to the apertures 104. The bracket 106 includes an inner wall 110 and an outer wall 112. The distance between the inner and outer walls 110 and 112 is such that the first leg 16 may be received therein in a snugly fit manner.

The length and width of the bracket 106 is adapted to the length and width of the leg 16. The top portion of the bracket 106 is also flared to ease the insertion of the first leg 16.

The first leg-restraining element 40 includes an elongated wall 41 that is configured and sized for insertion between the inner and outer walls 110 and 112 of the bracket 106 so as to contact the first leg 16 of the coil 10 therein. The wall 41 is integral and perpendicular to a first intermediary support plate 134 that includes apertures 136 that allows securing the intermediary support plate 134 to the movable portion 28 via a mounting plate 138 using fasteners (not shown).

As will be described hereinbelow in more detail by way of reference to the operation of the machine 20, the wall 41 prevents adverse movements of the first leg 16 of the coil 10 during forming of its heads 12-14 by selectively restraining the leg 16 into the leg-receiving mechanism 38.

The first leg gripper 23 further includes first and second head-forming elements 114 and 116, each secured to a respective raised portion 118-120 of the support plate 100. The raised portions 118 and 120 are positioned adjacent a respective longitudinal end of the U-shaped bracket 106.

According to another embodiment (not shown), the raised portions 118 and 120 are omitted and the first and second head-forming elements 114 and 116 are configured and sized to yield the configuration and size of the combined elements they replace.

The first leg gripper 23 also includes third and fourth head-forming elements 124 and 125, which are secured to the mounting plate 138 so as to be adjacent a respective longitudinal end of the wall 41. The elements 124 and 125 are further configured and sized to cooperate with the respective first and second head-forming elements 114 and 116 to restrain the movement and impart a predetermined form to a selected portion of the coil head 12 when the gripper 23 is closed onto the leg 16 of the coil 10.

More specifically, the first head-forming element 114 includes a groove 121 and the third forming element 124 includes a wall 123 that is registered with the groove 121 when the first leg gripper 23 is closed. As will be described hereinbelow in more detail, this arrangement allows immobilizing a selected part of the coil head 12 during one of the head-forming steps.

Moreover, each of the cooperating pairs of first and third head-forming elements 114 and 124 and second and fourth head-forming elements 116 and 125 defines a support flange against which a first half of the coil head 12 is pressed to cause a first controlled deformation thereof during relative movement of the first and second leg grippers 23 and 25. The fourth head-forming element 125 further includes a small triangular shape projection 129 defining an edge that extends downwardly from the element 125. As will become more apparent hereinbelow, the projection 129 defines a low contact front.

The second leg-receiving mechanism 74 includes a support plate 126 and a flaring U-shaped bracket 128 mounted to the support plate 126. The bracket 128 includes an inner wall 141 and an outer wall 143. The top portion of the bracket 128 flares to facilitate the insertion of the second leg 18 and to cause the movement of the leg-receiving mechanism 74 as will be described hereinbelow. It is to be noted that the U-shaped bracket 128 is taller than the U-shaped bracket 106 of the first leg-receiving mechanism 38. As will be described hereinbelow in more detail, the two brackets are positioned and sized so that when their top openings are registered, the bottom of the bracket 128 is deeper than the bottom of the other bracket 106.

As can be better seen from FIG. 8, the second leg-restraining mechanism 76 also includes an elongated wall 77 that is configured and sized for insertion in the U-shaped bracket 128. The wall 77 is integral and perpendicular to an intermediary support plate 140 that includes apertures 142 that allows securing the intermediary support plate 140 to the mounting plate 135 using fasteners (not shown).

As will be described hereinbelow in more detail, the wall 77 allows preventing adverse movement of the second leg 18 of the coil 10 during forming of its heads 12-14 by selectively restraining the leg 18 into the second leg-receiving mechanism 74.

Anyone or both of the first and second leg-restraining mechanisms 40 and 76 can have other adequate forms for this function.

Figure 9:
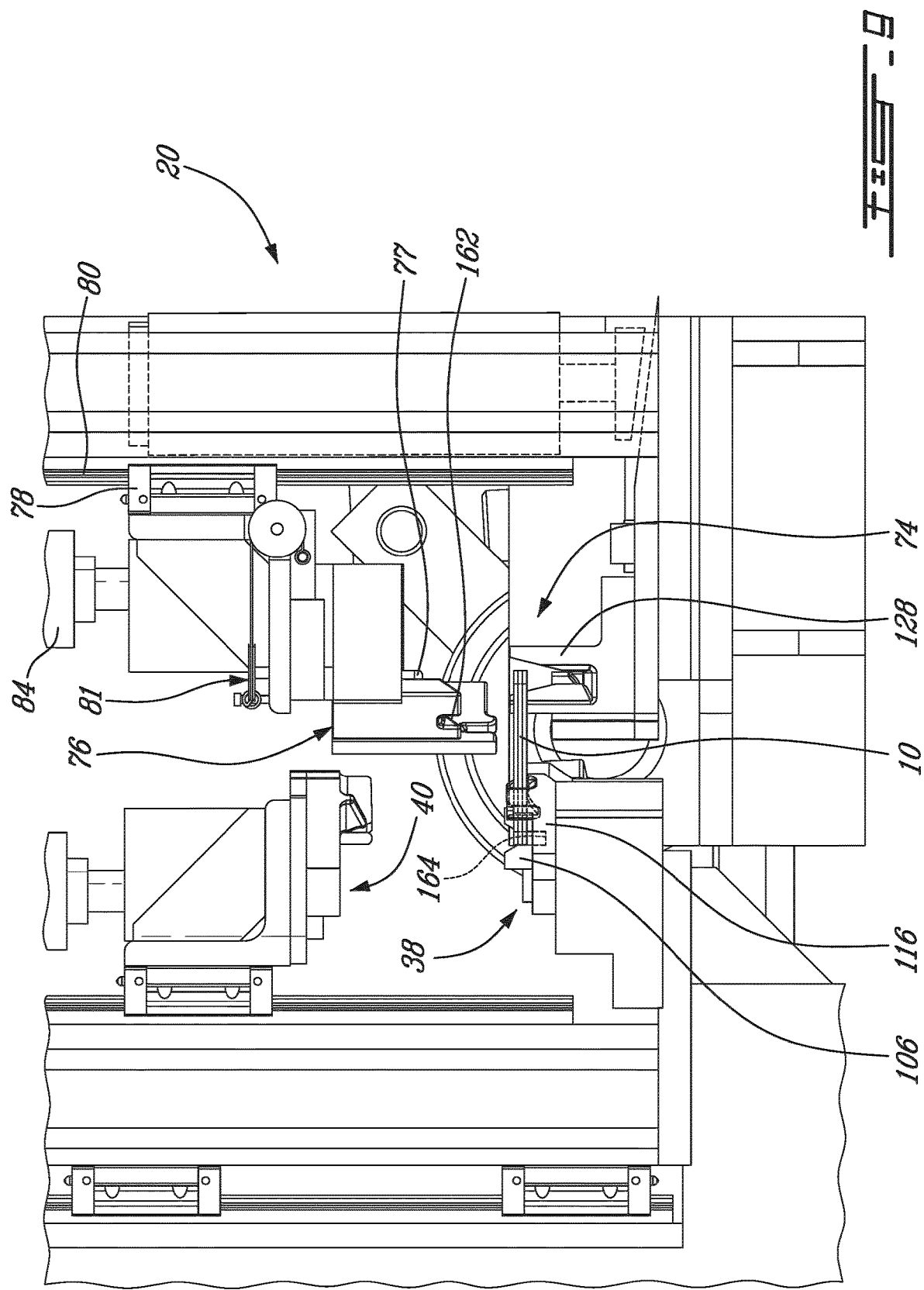
FIGS. 9 to 15 are front elevation close up views of the head-forming machine of FIG. 3, illustrating the operation thereof.

Turning briefly to FIG. 9 of the appended drawings, the second leg-restraining mechanism 76 is so mounted to the end of the piston 84 that it may move laterally onto corresponding sliding elements (not shown). A spring loaded return mechanism 81 ensures that the mechanism 76 returns to the position illustrated in FIG. 9 when not in use.

The second leg-receiving mechanism 74 further includes fifth head-forming element 132 that is mounted to the support plate 126 so as to be adjacent one longitudinal end of the U-shaped bracket 106. The element 132 includes a groove 127 that acts as coil wire guide and restrainer.

The support plate 126 is further provided with two parallel and distanced rectangular wedge portions 130 that extends from the main rectangular portion of the plate 126 on a side thereof, the reason of which will be described hereinbelow.

The second leg gripper 25 further includes sixth and seventh head-forming elements 154 and 156 mounted to the plate 135 at opposite ends of the wall 77. Each of the head-forming elements 154-156 includes a respective protruding wall 158-160 that is provided with a notch 162. Each notch 162 defines a coil wire guide when the second leg gripper 25 is closed and the distal edges of the protruding walls 158 and 160 contact the support plate 126. The sixth head-forming element 154 is configured and positioned to cooperate with the fifth head-forming element 132 when the second leg gripper 25 is closed onto the second leg 18.

The shape, size, position and number of the head-forming elements 114, 116, 124, 125, 132, 154 and 156 are configured to cause predetermined deformations of the coil heads 12 and 14 upon actuating the first and second leg grippers 25 and/or 23 and the first and second mounting assemblies 24 and 26.

According to the first illustrative embodiment, the head-forming elements 114, 116, 124, 125, 132, 154 and 156 are removably mounted to a respective support 100, 126, 134 and 140 via fasteners. This allows adapting the machine 10 to other predetermined formation and/or differently shaped coil. According to another embodiment (not shown), the head-forming elements are secured to the support plates adjacent the U-shaped brackets 106 and 128 using other fastening means such as welding.

According to still another embodiment (not shown), the first and second leg supports leg-receiving mechanisms 38 and 74 and first and second leg-restraining mechanisms 40 and 76 are shaped with integral head-forming elements.

Other mechanisms or elements than U-shaped brackets can be used to receive and limit the movements of the wire coil legs.

Turning now to FIGS. 9 to 15, the operation of the machine 20 will be described.

Generally stated, the operation of the machine 20 includes gripping the two legs 16 and 18 of the coil 10 and moving the legs 16-18 relatively to head-forming elements for contact therebetween to cause the controlled and predetermined deformation of the heads.

FIG. 9 illustrates the machine 20 immediately after the unformed coil 10 has been inserted in the flaring U-shaped brackets 106 and 128 of the first and second leg-receiving mechanisms 38 and 74. It is to be noted that, at this stage, the first and second leg-restraining mechanisms 40 and 76 are in their resting position wherein the first and second legs 16 and 18 are unrestrained respectively in the first and second leg-receiving mechanisms 38 and 74. Also, in this preliminary position of the machine 20, the top of the second leg-receiving mechanism 74 is generally level with the top of the first leg-receiving mechanism 38. Since the second leg flaring U-shaped bracket 128 is taller/deeper than the first flaring U-shaped bracket 106, the second leg 18, inserted in the second U-shaped bracket is unrestrained when the first leg 16 is positioned in the first U-shaped bracket 106. The second leg 18 is also prevented to sit at the bottom 164 of the first U-shaped bracket 106 by the first and second head-forming elements 114 and 116 and rests suspended therebetween.

Figure 10:
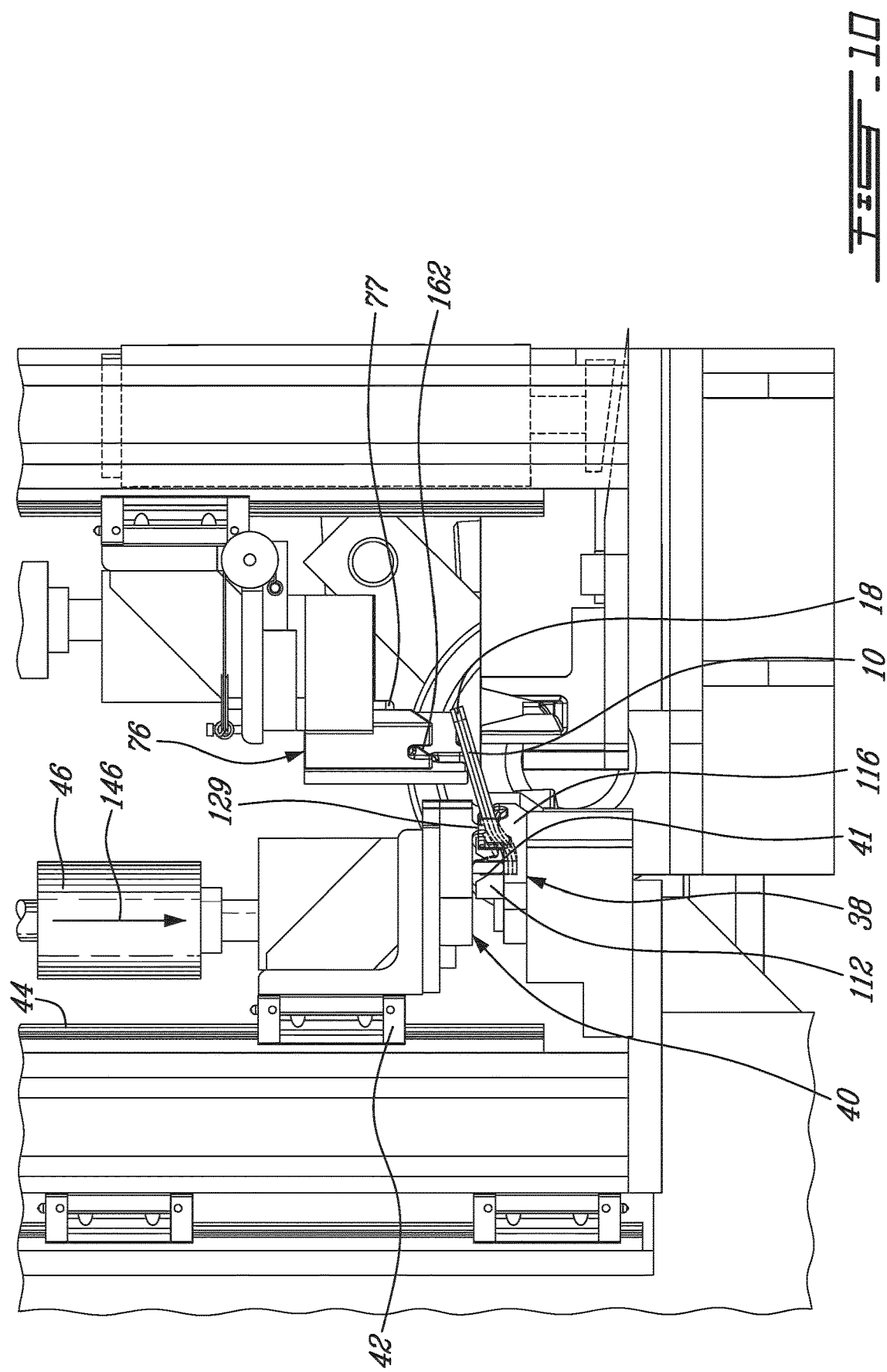

Next, as shown in FIG. 10, the first leg-restraining mechanism 40 is lowered (see arrow 146) under the action of the piston 46, placing the mechanism 40 in a gripping position. This movement is made possible via the corresponding sliding elements 42 and 44. As can be seen from this figure, the projection 129 forces and maintains a precise portion of the first leg 16 onto the second head-forming element 116. At the other end of the coil 10, the low contact wall 123 forces and maintain another portion of the first end 16 onto the head-forming element 114. In the same continuous downward movement, the wall 41 goes between walls 110 and 112 of the first U-shaped bracket 106, and abuts the first leg 16 to thereby force and maintain the first leg 16 at the bottom 164 of the first leg-receiving mechanism 38, causing first controlled deformation of the coil 10.

As can be seen in FIG. 10, the second leg 18 being unrestrained by the second leg-restraining mechanism 76 when the first restraining mechanism 40 is moved towards the first leg-restraining mechanism 38, the above-described first deformations of the coil 10 does not cause any uncontrolled deformation to the coil 10.

Figure 11:
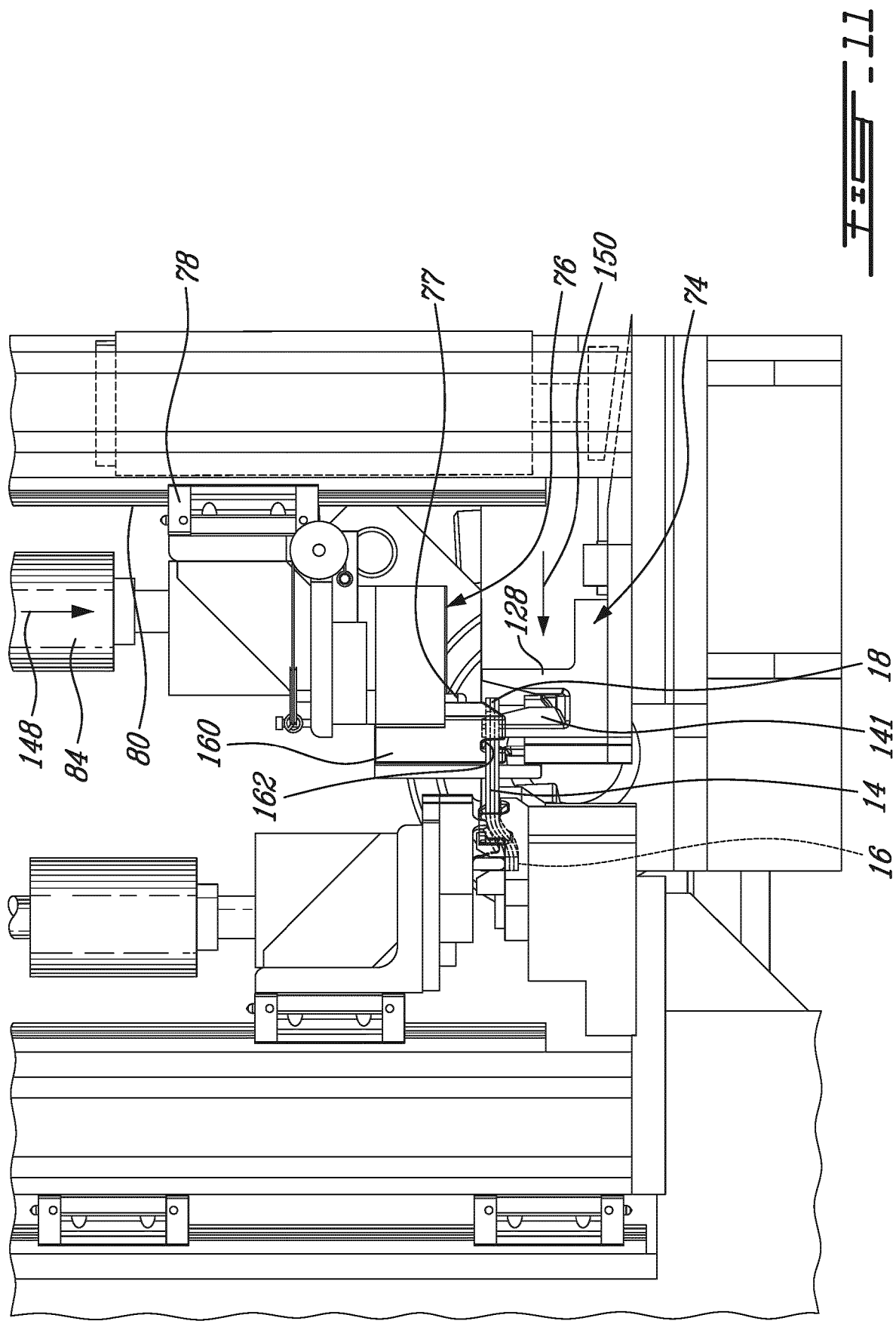

In the next step, illustrated in FIG. 11, the second leg-restraining mechanism 76 is lowered (see arrow 148) under the action of the piston 84. This movement is made possible via the corresponding sliding elements 78 and 80. As can be seen from this Figure, the second leg 18 abuts the inner wall 141 of the flaring U-shaped bracket 128. It will be understood that further downward movement of the leg-restraining mechanism 76 causes lateral movement of the second leg-receiving mechanism 74 towards the first leg-receiving mechanism 38, as illustrated by arrow 150, thanks to the contact between the second leg 18 and the inner wall 141. Accordingly, the alignment between the second leg 18 and the flaring U-shaped bracket 128 is not critical.

We can also see in FIG. 11 that the coil head 14 is received in the notch 162 of the protruding wall 160. The same is true for the protruding wall 158 (not shown).

Figure 12:
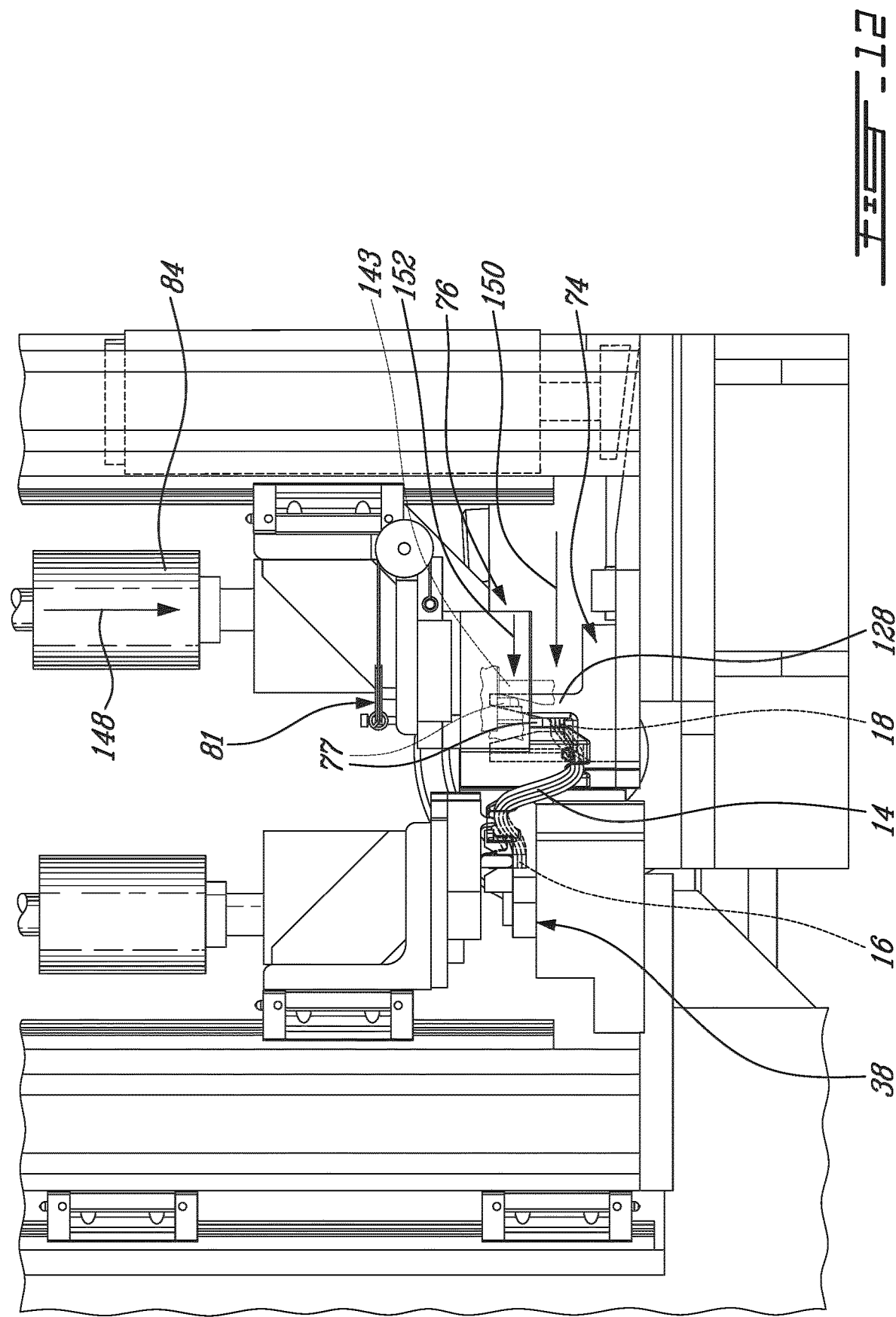

FIG. 12 shows the further downward movement of the mechanism 76 (see arrow 148) until it reaches its gripping position. The contact between the coil heads and the notches 162 and the other head-forming elements causes controlled deformation of the coil head. It is to be noted that the second leg-receiving mechanism 74 is kept free to move towards the first leg-receiving mechanism 38 (see arrow 150) during the downward movement of the leg-restraining mechanism 76. As mentioned hereinabove, this movement is caused by the contact between the second leg 18 and the inner wall 141. This free movement ensures that there is no undesired deformation of the heads leading to a coil similar to the coil of the prior art (see FIG. 1). Indeed, by allowing the free movement of the second leg-receiving mechanism 74 during the movement of the leg-restraining mechanism 76, the distance between the legs 16 and 18 is changed according to the deformation of the heads, which prevents uncontrolled deformation as the one shown in the prior art of FIG. 1.

A portion of the leg-restraining mechanism 76 including the second wall 77 is shown in dashed lines in FIG. 12 to illustrate an intermediate state of the leg restraining mechanism 76. In this intermediate state, the second wall 77 contacts the outer wall 143 of the U-shaped bracket 128 to thereby cause a lateral movement of the leg-restraining mechanism 76 (see arrow 152). One can note the elongation of the spring-loaded return mechanism 81. Accordingly, the alignment between the second leg-restraining mechanism 76 and the flaring U-shaped bracket 128 is not critical.

Figure 13:
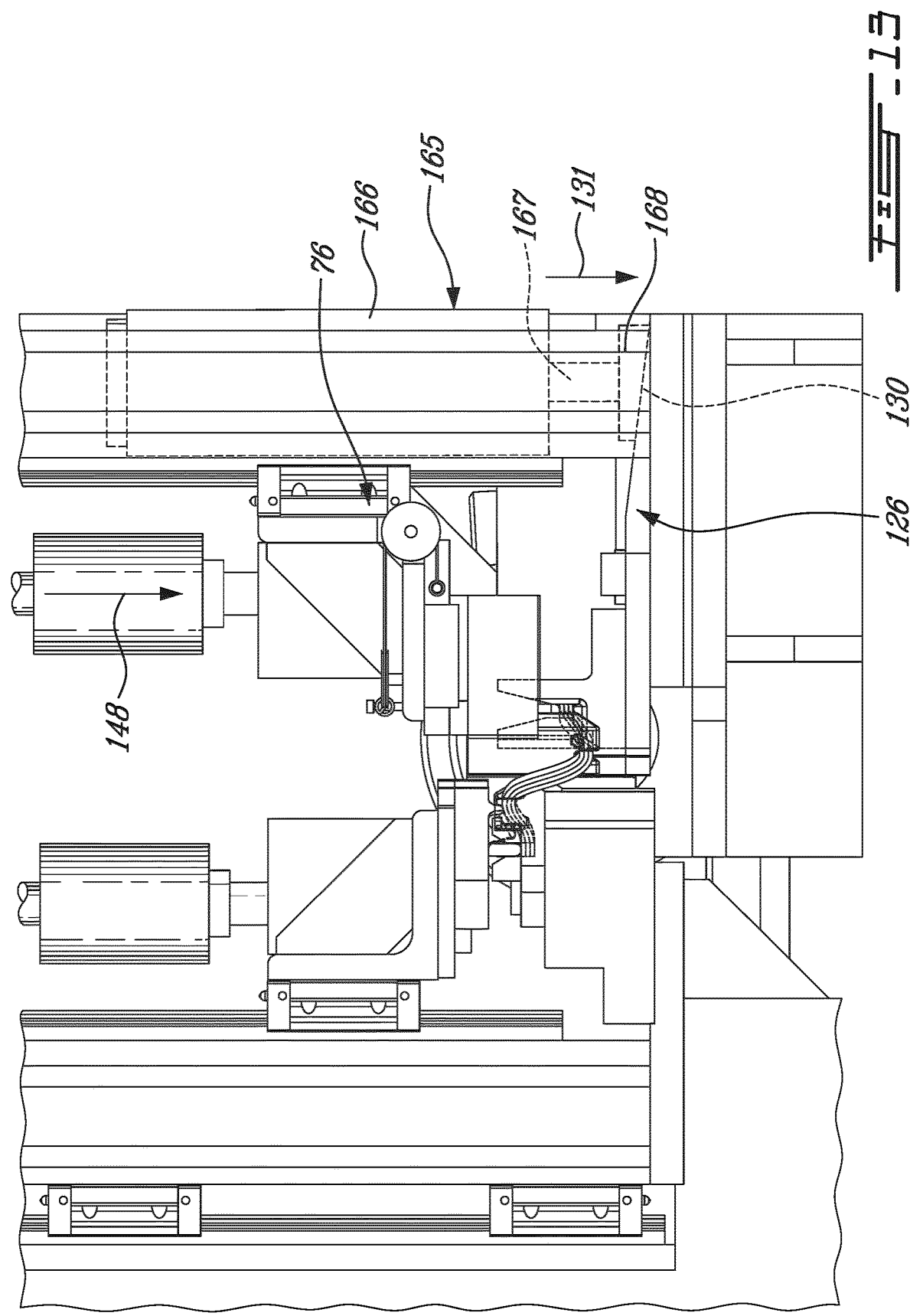

The downward movement of the second leg-restraining mechanism 76 continues until the second leg 18 abuts the bottom of the flaring U-shaped bracket 128 and is restrained by the second wall 77 therein. At this point, which is illustrated in FIG. 13, the transversal position of the second leg gripper 25 is locked by a mechanical stopping assembly 165 including a cylinder 166, a piston 167 and a wedge head 168. Accordingly, when the cylinder 166 is actuated, the piston 167 extends (see arrow 131) and forces the contact between the head 168 and the wedge portion 130 of the plate 126, thereby preventing further movements of the plate 126 and of the elements of the second leg gripper mounted thereto.

Figure 14:
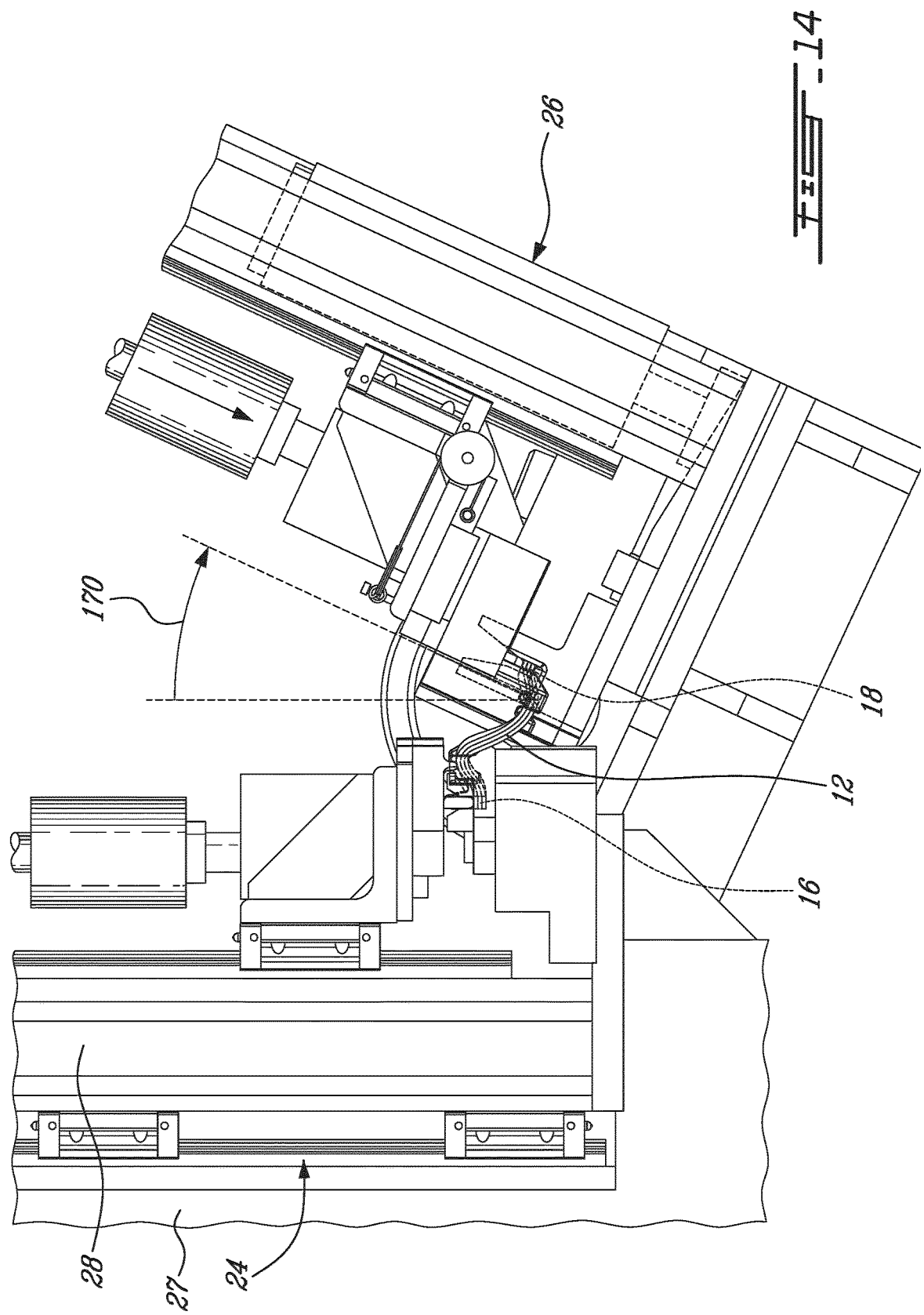

With reference to FIG. 14, the second assembly 26 is then pivoted with respect to the first assembly 24 (see arrow 170) under the action of the piston 88 of the cylinder 90 acting on the shaft 68 (see FIG. 4). This actuated movement of the second assembly 26 causes further controlled deformation of the heads 12 and 14 of the coil 10. Indeed, since the legs 16 and 18 are firmly secured between the receiving and restraining assemblies 38, 40, 74 and 76, the pivoting action causes the heads 12 and 14 to be deformed by their further contact with the first, sixth and seventh head-forming element 114, 154 and 156 (see FIGS. 7 and 8). As can also be seen from FIG. 14, the movement along the direction of arrow 170 causes the heads 12 and 14 to deform according to a wave-shape. Furthermore, this pivoting movement ensures that the legs 16 and 18 of the coil will conform to the angle of the slots of the stator (not shown) that will receive the legs.

Figure 15:
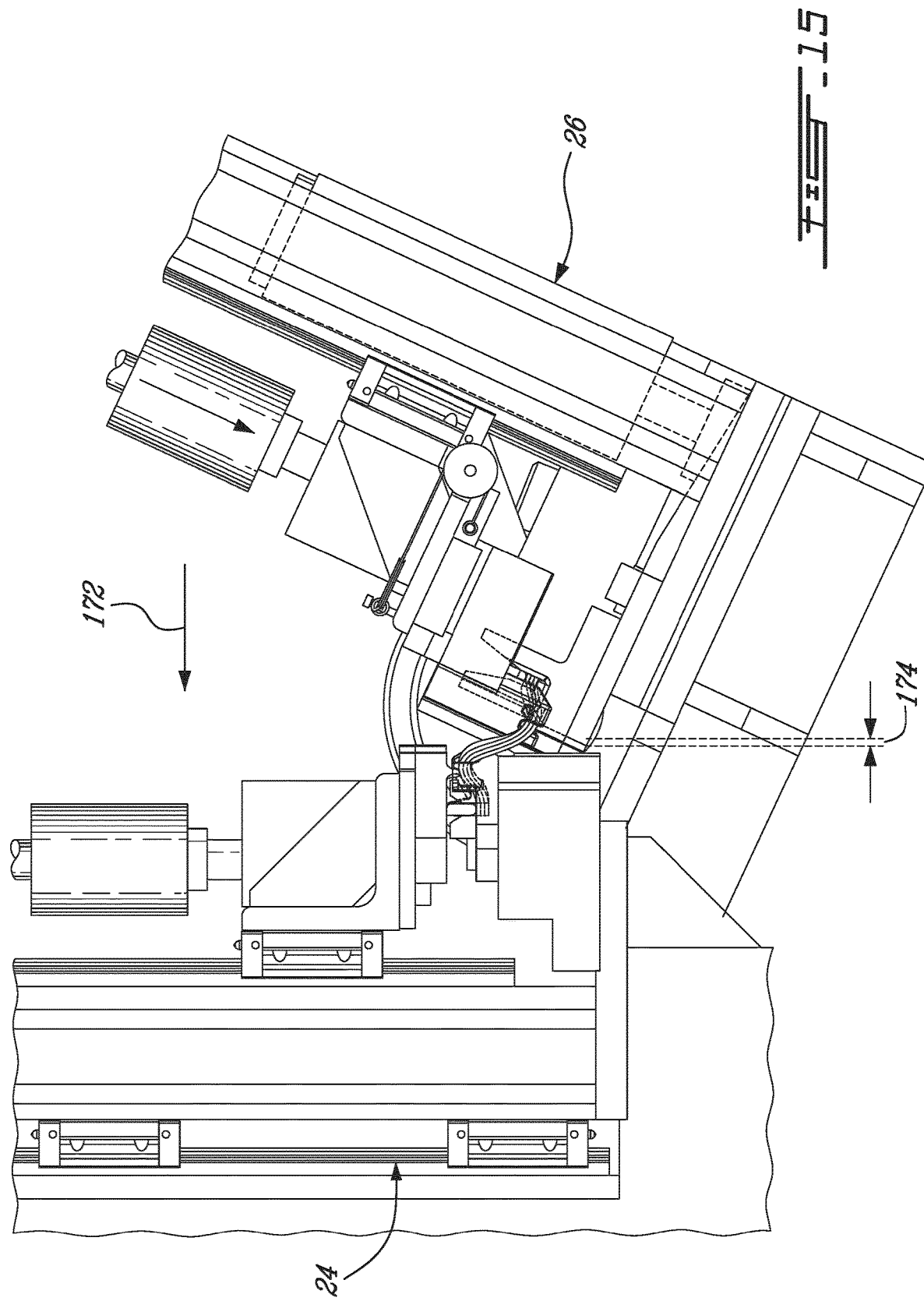
Figure 16:
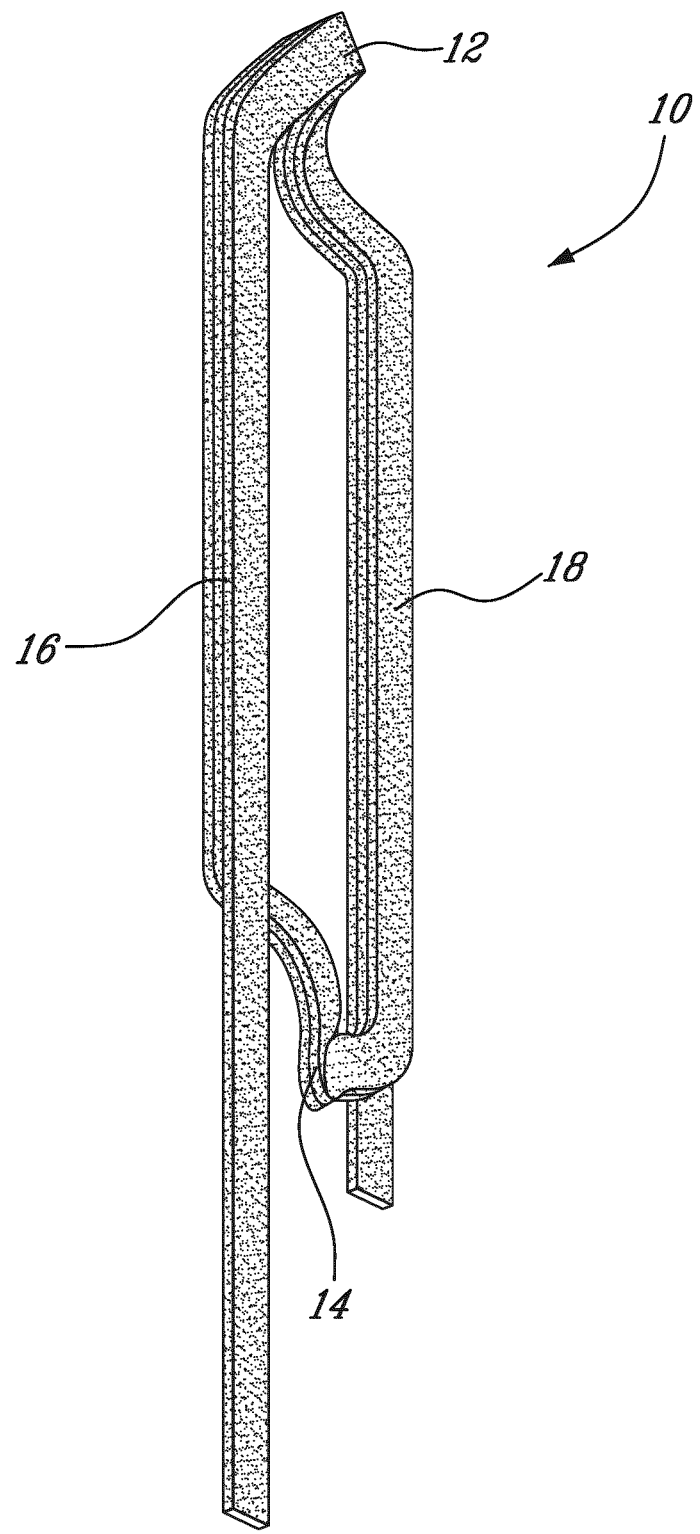
FIG. 16 is a perspective view of the coil of FIG. 2 after its heads having being formed by the machine from FIG. 3.

The last step in the deformation of the coil 10 is illustrated in FIG. 15. This last step includes the actuated movement of the second assembly 26 towards the first assembly 24 (see arrow 172). This movement is actuated by the piston 56 of the cylinder 58 (see FIG. 4). It is to be noted that the amplitude of the sliding movement of the second assembly 26 (see arrow 174) is limited by the adjustable stop 60 (see FIG. 3). As can be seen from FIG. 15, the movement along the direction of arrow 172 causes the heads 12 and 14 to deform so that the distance between the legs 16 and 18 is the adequate distance for the insertion into the slots of the stator (not shown). This deformation gives the heads 12 and 14 their final shape illustrated in FIG. 16.

To remove the resulting formed coil 180 from the machine 20, the leg-restraining mechanisms 40 and 76 are returned to their original position. The formed coil 180 may then be removed from the leg-receiving mechanisms 38 and 74.

Figure 1:
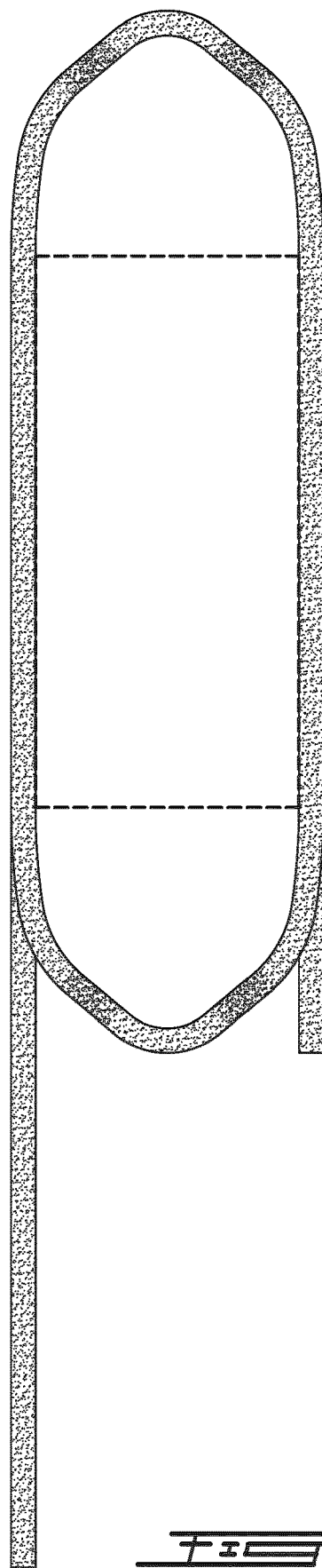
FIG. 1, which is labelled "Prior Art", is a top plan view of a coil made of semi-rigid rectangular wire according to the prior art.
Figure 17:
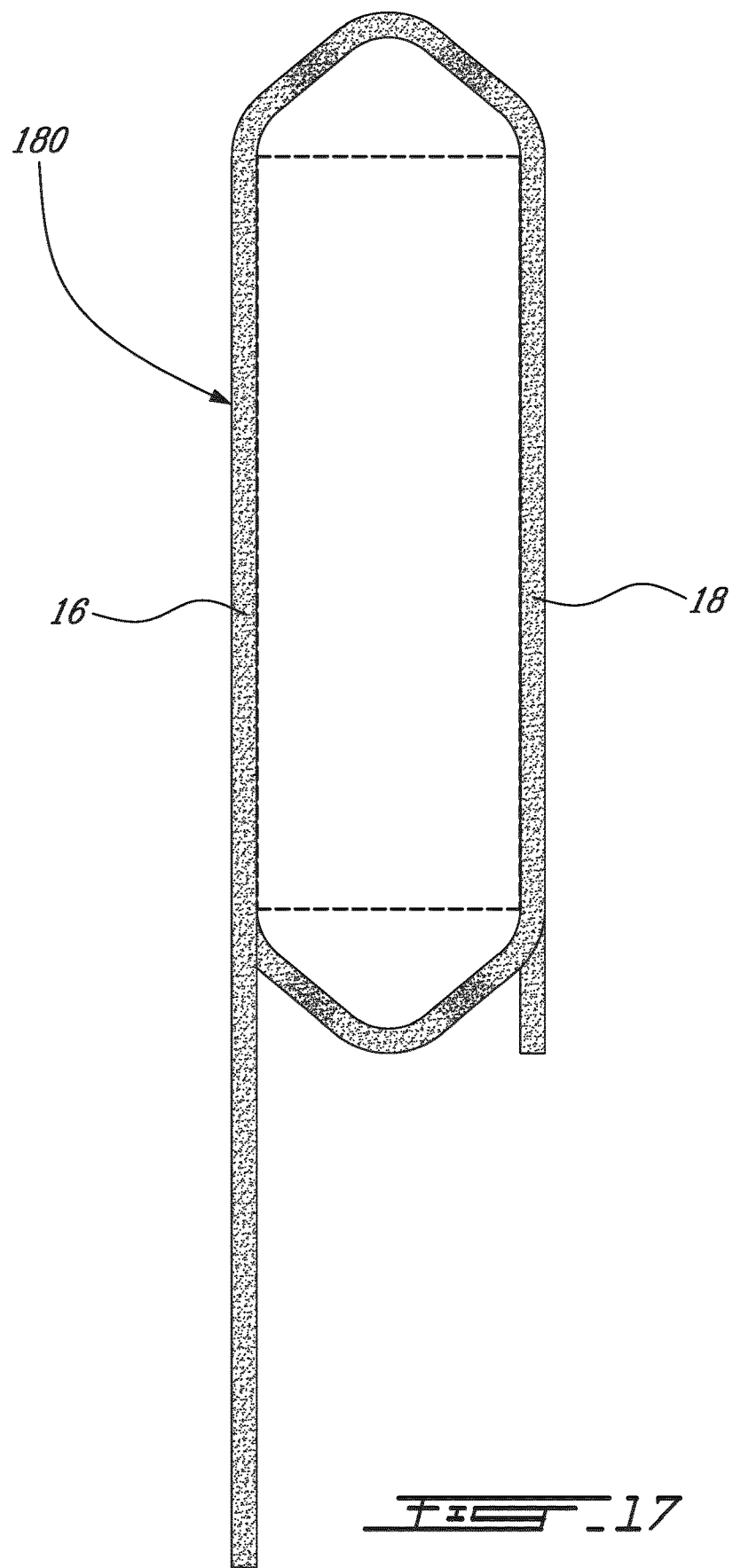
FIG. 17 is a top plan view of the formed coil of FIG. 16.

As can be seen in FIG. 17, the heads 12 and 14 of the formed coil 180 are more precisely defined than the formed head from the prior art and the straight portions of the legs 16 and 18 are longer than the corresponding straight portions shown in the coil of the prior art (see FIG. 1).

It is to be noted that the distances and angles of movement of the various elements of the machine 20 have been illustrated herein as examples only and are adjustable by the controller 92 and/or the various adjustable stops. Furthermore, the elements of the machine could be resized as required by larger or smaller coils.

The head-forming elements can have other shapes and configurations than those illustrated so as to impart other forms to the heads 12 and 14. Moreover, different head-forming elements can be used for different portions of the heads 12 and 14.

It is believed to be within the reach of a person skilled in the art to modify the machine 20 to allow for other or additional relative movements between head-forming elements 114, 116, 124, 125, 127, 154 and 156 and the heads 12 and 14 via the first and second leg support mechanisms 23 and 25.

The first and second leg supports 23 and 25 can take other form than those illustrated allowing receiving and restraining the legs 16 and 18.

Even though some elements of the machine 20 have been illustrated fastened using fasteners, other fastening means can be used including welding, clipping, etc.

A machine for forming the heads of a semi-rigid wire coil is not limited to rectangular wires and can be used to form heads of semi-rigid wire coil formed from any wire having a cross section characterized by having two parallel faces.

Although the machine for shaping rectangular wire coil heads and method therefor have been described hereinabove by way of illustrated embodiments thereof, it can be modified. It is therefore to be understood that numerous modifications may be made to the illustrative embodiments and that the scope of the claims should not be limited by the preferred embodiment, but should be given the broadest interpretation consistent with the description as a whole.

What is claimed is:

1. A machine for forming first and second heads of a semi-rigid wire coil separated by first and second legs, the machine comprising:
   a frame;
   a first leg gripper mounted to the frame and including a first leg-receiving mechanism for receiving the first leg and a first leg-restraining mechanism that is movable relative to the first leg-receiving mechanism between a first resting position and a first gripping position that immobilizes the first leg in the first leg-restraining mechanism, wherein the first leg-restraining mechanism has a single elongated wall sized for insertion between an inner and outer wall of a bracket sized to receive the first leg of the coil;
   a second leg gripper including a second leg-receiving mechanism for receiving the second leg and a second leg-restraining mechanism that is movable relative to the second leg-receiving mechanism between a second resting position and a second gripping position that immobilizes the second leg in the second leg-restraining mechanism; the first and second leg grippers being mounted to the frame for at least one actuated movement of one of the first and second legs, wherein the second leg-restraining mechanism has an elongated wall sized for insertion in a U-shaped bracket of the second leg-receiving mechanism; and
   at least one head-forming element mounted to one of the first and second leg grippers for contacting at least a portion of one of the first and second heads of the wire coil during the at least one actuated movement;
   wherein the second leg gripper being further mounted to the frame so as to allow free movement thereof towards the first leg gripper during the movement of the second leg-restraining mechanism between the second resting position and the second gripping position.

2. The machine as recited in claim 1, further comprising a mechanical stopping assembly selectively preventing movement of the second leg gripper towards the first leg gripper when the second leg-restraining mechanism is in the second gripping position.

3. The machine as recited in claim 2, wherein the mechanical stopping assembly includes a cylinder and a piston actuatable to contact a portion of second leg-receiving mechanism.

4. The machine as recited in claim 1, wherein the at least one actuated movement of one of the first and second legs is selected from the group consisting of a translation along a first axis, a translation along a second axis, a pivot about a third axis or a sequence including at least two of the translation along a first axis, the translation along a second axis, and the pivot about a third axis.

5. The machine as recited in claim 1, wherein said at least one head-forming element includes an edge for imparting a shape to said portion of one of the first and second heads.

6. The machine as recited in claim 1, wherein said at least one head-forming element includes at least one of a groove, a notch and a thin wall for contacting said portion of one of the first and second heads of the wire coil.

7. The machine as recited in claim 1, wherein each of said first and second leg grippers is mounted to the frame via respective first and second mounting assembly; said first mounting assembly including a first movable portion movably mounting said first leg gripper to said frame; said first mounting assembly further including a first actuator mounted to both said first movable portion and said frame for selectively moving said first movable portion relatively to said frame.

8. The machine as recited in claim 7, further comprising a controller coupled to both said first actuator for controlling the operation thereof.

9. The machine as recited in claim 7, wherein said first leg gripper further includes a leg-restraining actuator coupled to both the first leg-restraining mechanism and the first movable portion for selectively moving the first leg-restraining mechanism between the first resting position to a first restraining position.

10. The machine as recited in claim 9, wherein the second mounting assembly further includes at least one stop for limiting a range of motion of the second movable portion relatively to the frame.

11. The machine as recited in claim 7, wherein said second leg gripper further includes a leg-restraining actuator coupled to both the second leg-restraining mechanism and the second movable portion for selectively moving the second leg-restraining mechanism between the second resting position to the second restraining position.

12. The machine as recited in claim 7, wherein at least one of the first and second leg gripper further comprises a support plate secured the corresponding one of the first and second movable portion; the corresponding one of the first and second leg-receiving mechanism being mounted to the support plate.

13. The machine as recited in claim 12, wherein the first leg-receiving mechanism includes a U-shaped bracket mounted to the support plate and configured for receiving the the first legs therein.

14. The machine as recited in claim 13, wherein the at least one head-forming element is mounted to the support plate.

15. The machine as recited in claim 7, wherein at least one of the first and second mounting assemblies further includes a stop for limiting a range of motion of the corresponding one of the first and second movable portion relative to the frame.

16. The machine as recited in claim 7, wherein the first movable portion is slidably mounted to the frame so as to be movable along a first axis.

17. The machine as recited in claim 16, wherein the second mounting assembly includes a second movable portion movably mounting the second leg gripper to the frame; the second mounting assembly further including a second actuator mounted to both the second movable portion and the frame for selectively moving the second movable portion relatively to the frame.

18. The machine as recited in claim 17, wherein the second movable portion is slidably mounted to the frame so as to be movable along a second axis perpendicular to the first axis.

19. The machine as recited in claim 18, wherein the second movable portion includes a supporting table slidably mounted to the frame.

20. The machine as recited in claim 19, wherein the second mounting assembly further includes a pivoting sub-assembly pivotably mounted to the supporting table; the second movable portion being slidably mounted to the pivoting sub-assembly; the pivoting sub-assembly further including a pivoting actuator mounted to the frame for pivoting the second leg support mechanism relatively to the first leg-receiving mechanism.

21. The machine as recited in claim 20, further comprising a controller coupled to the first, second, third and pivoting actuators for controlling an operation thereof.

22. The machine as recited in claim 16, further comprising a controller coupled to the first and second actuators for controlling the operation thereof.

23. The machine as recited in claim 1, further comprising a first actuator mounted to the frame and to the second leg gripper for causing the at least one actuated movement.

24. The machine as recited in claim 23, further comprising a controller coupled to the first actuator for controlling the operation thereof.

25. The machine as recited in claim 1, wherein the at least one head-forming element includes a first head-forming elements secured to one of the first and second leg support and a second head-forming element secured to the corresponding first or second leg-restraining mechanism.

26. The machine as recited in claim 1, wherein the wire coil is made of a rectangular wire.

27. The machine as recited in claim 1, wherein at least one head-forming element comprises a triangular shape projection defining an edge that extends downwardly from the head-forming element.

28. The machine as recited in claim 1, wherein the elongated wall of the first leg restraining mechanism is integral and perpendicular to a first intermediary support plate comprising apertures that allow securing the first intermediary support plate to a moveable portion via a mounting plate.

* * * * *